United States Patent
McKenney

(10) Patent No.: US 7,447,868 B2
(45) Date of Patent: Nov. 4, 2008

(54) USING VECTOR PROCESSORS TO ACCELERATE CACHE LOOKUPS

(75) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 471 days.

(21) Appl. No.: 11/153,048

(22) Filed: Jun. 15, 2005

(65) Prior Publication Data

US 2006/0288151 A1    Dec. 21, 2006

(51) Int. Cl.
    G06F 9/26    (2006.01)
    G06F 9/34    (2006.01)
    G06F 12/00   (2006.01)
    G06F 13/00   (2006.01)
    G06F 13/28   (2006.01)

(52) U.S. Cl. .............. 711/203; 711/118; 711/202; 711/205

(58) Field of Classification Search ................ 711/203
    See application file for complete search history.

(56) References Cited

U.S. PATENT DOCUMENTS 5,148,536 A    9/1992    Witek et al.
5,325,507 A *  6/1994    Freitas et al. .............. 365/49
5,379,393 A    1/1995    Yang
6,496,902 B1 * 12/2002   Faanes et al. ............. 711/118

FOREIGN PATENT DOCUMENTS

EP    0 352 633    1/1990

* cited by examiner

Primary Examiner—Kevin Ellis
Assistant Examiner—Ryan Bertram
(74) Attorney, Agent, or Firm—Canady & Lortz LLP; Bradley K. Lortz

(57) ABSTRACT

Typical embodiments of the present invention maintain the cache metadata in arrays, and use vector instructions to process the array elements in parallel. The cache metadata comprises virtual tags corresponding to main memory addresses and physical addresses corresponding to cache memory addresses. The virtual tags and physical addresses may be interleaved in a single array in the cache memory. Alternately, virtual tags and physical addresses may be maintained in corresponding separate arrays. A roving pointer may be used to identify the next block to be ejected from the cache memory.

18 Claims, 14 Drawing Sheets

USING VECTOR PROCESSORS TO ACCELERATE CACHE LOOKUPS

BACKGROUND OF THE INVENTION

1. Field of the Invention

This invention relates to computer processors and computer processing system designs. Particularly, the invention relates to central processing units (CPUs) utilizing vector processors.

2. Description of the Related Art

A vector processor is a type of CPU that is employed in an architecture able to run mathematical operations on a large number of data elements very quickly. This is in contrast to a scalar processor which handles one element at a time. Currently most CPUs are scalar processors. Previously, vector processors were common in the scientific computing area, where they formed the basis of most supercomputers. But general increases in performance through improved processor designs have made most dedicated vector processors obsolete. However, today almost all large production CPU designs include some vector processing instructions, typically known as simple instruction/multiple data (SIMD).

In general, CPUs are capable of manipulating only one or two pieces of data at a time. For example, every CPU has some type of instruction to add two numbers and put the result in a particular location. To do this, the number data is usually "pointed to" by passing in an address to a memory location that holds the number data to be operated on. Decoding this address and getting the data out of the memory takes some time. As CPU speeds have increased, this time delay has become more significant.

In order to reduce the decoding delay, most conventional CPUs use a technique known as instruction pipelining, passing instructions though several sub-units in turn. For example, a first sub-unit reads the address and decodes it, a second sub-unit receives the values, and a third performs the mathematical operation. With pipelining, it is important to start decoding the next instruction even before the first has departed the CPU, so the address decoder is constantly in use. Any particular instruction takes the same amount of time to complete (i.e., the latency), but the CPU can process the entire batch much faster than if it performed each instruction completely in a serial fashion.

Vector processors take the concept of instruction pipelining further. Instead of pipelining only the instructions, vector processors also pipeline the data. For example, vector processors may be provided instructions that direct not only adding two values, but also adding all of the values in a defined range to all of the values in another defined range. Instead of constantly decoding instructions and then retrieving the data needed to complete them, vector processors read a single instruction from memory, and anticipate what the next address is, e.g. the next address increment. This technique yields significant savings in the overall decoding time.

Completing a single vector instruction may take longer than adding-two-numbers instruction in the general purpose CPU. However, this single vector instruction with represents many instructions of the general purpose CPU. The vector processor avoids much of the address decoding and also has only a single vector instruction to decode. Since the instructions are also stored in general memory, and general memory is typically very slow compared to the CPU, this technique dramatically improves overall performance by allowing the data set to be read from memory very quickly.

In addition, the vector processor is typically produced in some form of superscalar implementation. Accordingly, when a range of numbers are added, multiple parts of the CPU (e.g. two or four) perform the addition, not just one. Since the output of a vector command does not rely on the input from any other vector processor, the multiple parts can each add some of the numbers in parallel. Thus, the whole operation is completed in a fraction of the time. Vector processors are particularly suited for applications where large amounts of data are operated on. Accordingly, vector processors have historically been used in supercomputers which are specifically designed to process huge amounts of data.

In addition, recent advances in CPU design have provided high-performance systems with multiple independent vector processors in other applications as well, such as the cell processor. The cell processor employs nine cores, one acting as a controller while the remaining cores (i.e. attached processing units [APUs]) are very high performance vector processors. Each APU includes a block of very high speed memory. The APUs can operate independently or process a stream of data in combination with other APUs each working on different portions. This capability to function as a stream processor gives rise to the full processing potential of the cell processor.

Cell processors are specifically designed to function together. While they may be directly connected they may also be connected in other ways, even distributed over a network. Cell processors are not exclusively designed for any particular application, they can be in a wide range of devices, e.g. personal computers, game consoles, personal digital assistants (PDAs), televisions, other media devices. In additon, multiple cell processors can be used to effectively act as a single system. The infrastructure for this is built into each cell processor to operate on "software cells" which include routing information as well as programs and data.

Parallel processing is usually complex, requiring specific parallel programming to utilize the hardware. The cell processor does not require reprogramming; the operating system automatically reviews the available resources and distributes tasks. However, in may instances repogramming may be performed for the cell processor to obtain even greater performance for some applications, similar to the advantages obtained from programming in a low level language, e.g. machine language. Processing power is increased simply by adding more cells. Thus, the cell architecture provides distributed, parallel processing employing very powerful computational engines.

However, to achieve full speed, such processors (cell processors or other vector processor architectures) typically have limited, but extremely high performance, local memory, e.g., 256 Kbytes. Slower-speed access to a larger (e.g. multi-gigabyte) dynamic random access memory (DRAM) is also provided. To operate on problems requiring large (e.g. multi-gigabyte) datasets, some sort of caching is required. Since the hardware does not provide hardware caching capabilities in all cases, software caching may be used instead. In such instances, the processing speed of this software caching is crucial.

Typical prior art memory caching systems include hardware cache mechanisms and software hash, tree, and dense-array caching structures for mass-storage accesses. However, each of these caching approaches are difficult to directly employ with vector processors. For example, hardware cache mechanisms use dedicated special-purpose hardware to process the cache manipulation. This special-purpose hardware is not available on high-performance vector processors because this would slow down processing, increase power consumption, and reduce the number of vector units that could be place on a single die. Software hash, tree, and dense-array caching structures are typically employed for mass-strorage accesses. These structures require excessive overhead for local-memory-to-main-memory caches. This overhead is acceptable when the secondary memory is utilized on high-latency devices (e.g. mass storage devices), but not when the secondary memory is main memory DRAM. Examples of some prior art memory systems for processors are are as follows.

U.S. Pat. No. 5,379,393 by Yang issued Jan. 3, 1995, teaches a cache memory system for use during vector processing in a processor. The processor contains a CPU and a main memory. The system includes a vector cache memory, a first address register, a main memory address calculation unit, and a cache address calculation unit. The first register stores a first address associated with an instruction executed by the CPU. The main memory address calculation unit is coupled to the first address register for calculating a second address utilizing the first address and vector stride data associated with said executed instruction. The second address is utilized to access the main memory. The cache address calculation unit is coupled to both the first address register and the main memory address calculation unit for calculating the third address utilizing portions of the first address and portions of the second address. The third address is utilized to access the vector cache memory.

However, U.S. Pat. No. 5,379,393 merely uses hardware mapping based on primes related to a power of two in order to improve cache performance relative to a direct-mapped cache. The hardware caching approach adds to the hardware complexity and consumes additional power.

U.S. Pat. No. 5,148,536 by Witek et al. issued Sep. 15, 1992, teaches a load/store pipeline in a computer processor for loading data to registers and storing data from the registers that has a cache memory within the pipeline for storing data. The pipeline includes buffers which support multiple outstanding read request misses. Data from out of the pipeline is obtained independently of the operation of the pipeline, this data corresponding to the request misses. The cache memory can then be filled with the data that has been requested. The provision of a cache memory within the pipeline, and the buffers for supporting the cache memory, speed up loading operations for the computer processor.

However, U.S. Pat. No. 5,148,536 merely merges a hardware cache into a vector pipeline to allow misses to be processed without stalling the pipeline. Similar to U.S. Pat. No. 5,379,393 above, the hardware caching approach adds to the hardware complexity consumes additional power.

In view of the foregoing, there is a need in the art for a high-speed caching mechanism that can handle main memory (e.g. DRAM) as secondary storage. Accordingly, there is a consequent need for an extremely efficient cache-lookup mechanism to fully leverage vector instructions on vector processors. These and other needs are met by embodiments of the present invention as detailed hereafter.

SUMMARY OF THE INVENTION

Typical embodiments of the present invention maintain the cache metadata in arrays, and use vector instructions to process the array elements in parallel. There are a number of techniques which can be employed to organize the cache metadata. For example, the cache-tag and physical-address information may be interleaved into a single array. In another example, the cache-tag and physical-address information may be maintained in a plurality of separate arrays. In either case, there is a separate array mapping from a local-store cache line to a tag corresponding to the line currently loaded into that line. These arrays are located in a given vector processor's local store memory.

An exemplary computer program embodiment of the invention comprises program instructions for deriving a selected virtual tag from a selected virtual address of data in a main memory and placing the selected virtual tag in a data word, program instructions for replicating the selected virtual tag in the data word and program instructions for comparing the data word with an array comprising a plurality of virtual tags to identify a matching virtual tag. The selected virtual tag comprises a portion of the selected virtual address and the replicated selected virtual tag is compared substantially simultaneously with at least two of the plurality of virtual tags where the matching virtual tag corresponds to a physical address of the data in a cache memory. Comparing the data word with the array may be performed using vector instructions and include indexing the array by a bit-mask hash of a main memory address. The array may comprise an interleaved arrangement of the plurality of virtual tags and a plurality of physical addresses or alternately the array may comprise the plurality of virtual tags and a second array comprises a plurality of physical addresses such that there is a correspondence between each of the plurality of virtual tags and each of the plurality of physical addresses.

Further computer program embodiments of the invention may include program instructions for replacing a cache memory block indicated by a roving pointer with the data in the main memory at the selected virtual address in response to not matching the virtual tag or retrieving a cache memory block indicated by the physical address in response to matching the virtual tag.

The program instructions for deriving the selected virtual tag from the selected virtual address may include program instructions for masking and saving lower bits of the selected virtual address and program instructions for shifting upper bits of the selected virtual address to a lowest portion of a first register, the shifted upper bits comprising the selected virtual tag. Replicating the selected virtual tag into the word may comprise replicating the upper bits of the virtual address into a second portion of the first register. In addition, the program instructions for comparing the word with an array comprising a plurality of virtual tags to identify any matching virtual tag may include program instructions for masking the lower bits of the virtual address into a second register, program instructions for indexing with the second register into the cache metadata array and saving the corresponding entry in a third register and program instructions for comparing the replicated upper bits of the virtual address in the first register to the entry in the third register using vector instructions to perform the comparisons in parallel to identify a match.

An exemplary hardware embodiment of the invention comprises a plurality of vector processors, where each of the plurality of vector processors includes vector instructions for processing data. A main memory is used comprising main memory data and a plurality of cache memories. Each cache memory is coupled to each of the plurality of vector processors and comprises cache metadata and cache data, the cache data including a portion of the main memory data. The cache metadata is maintained in one or more arrays defining a correspondence between main memory data and cache memory data. In addition, each of the plurality of vector processors uses the vector instructions to process the cache metadata in parallel to identify the portion of the main memory data present in the cache data. In further embodiments of the invention, each cache memory may include a roving pointer indicating a block of data within the cache memory to be next replaced.

The cache metadata of the one or more arrays may comprise virtual tags corresponding to main memory addresses and physical addresses corresponding to cache memory addresses. Each of the virtual tags may comprise a portion of a main memory address and each of the physical addresses may comprise a portion of a cache memory address. The virtual tags and the physical addresses can be arranged in a single array wherein the virtual tags and the physical addresses are interleaved. Alternately, the virtual tags can be arranged in a first array and the physical addresses arranged in a second array where each of the virtual tags in the first array corresponds to each of the physical addresses arranged in the second array.

Similar to the computer program, an exemplary method embodiment of the invention comprises deriving a selected virtual tag from a selected virtual address of data in a main memory and placing the selected virtual tag in a data word, the selected virtual tag comprising a portion of the selected virtual address, replicating the selected virtual tag in the data word and comparing the data word with an array comprising a plurality of virtual tags to identify a matching virtual tag where the replicated selected virtual tag is compared substantially simultaneously with at least two of the plurality of virtual tags where the matching virtual tag corresponds to a physical address of the data in a cache memory. Comparing the data word with the array may be performed using vector instructions and include indexing the array by a bit-mask hash of a main memory address. The array may comprise an interleaved arrangement of the plurality of virtual tags and a plurality of physical addresses or alternately the array may comprise the plurality of virtual tags and a second array comprises a plurality of physical addresses such that there is a correspondence between each of the plurality of virtual tags and each of the plurality of physical addresses. The method embodiments of the invention may be further modified consistent with the computer program and hardware embodiments of the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Embodiments of the invention are generally directed to methods, apparatuses, and articles of manufacture for managing memory in conjunction with a vector processor architecture. Embodiments of the invention may be implemented in a range of computer systems. It should be noted that a computer system may be broadly construed to be any device employing a processor and memory. For example, in addition to personal computers (PCs) and server systems, a variety of stand-alone home media and entertainment devices, such as game systems or other dedicated media devices, are considered a computer system within the scope of the present invention.

1. Computer System Utilizing Vector Processors

Figure 1:
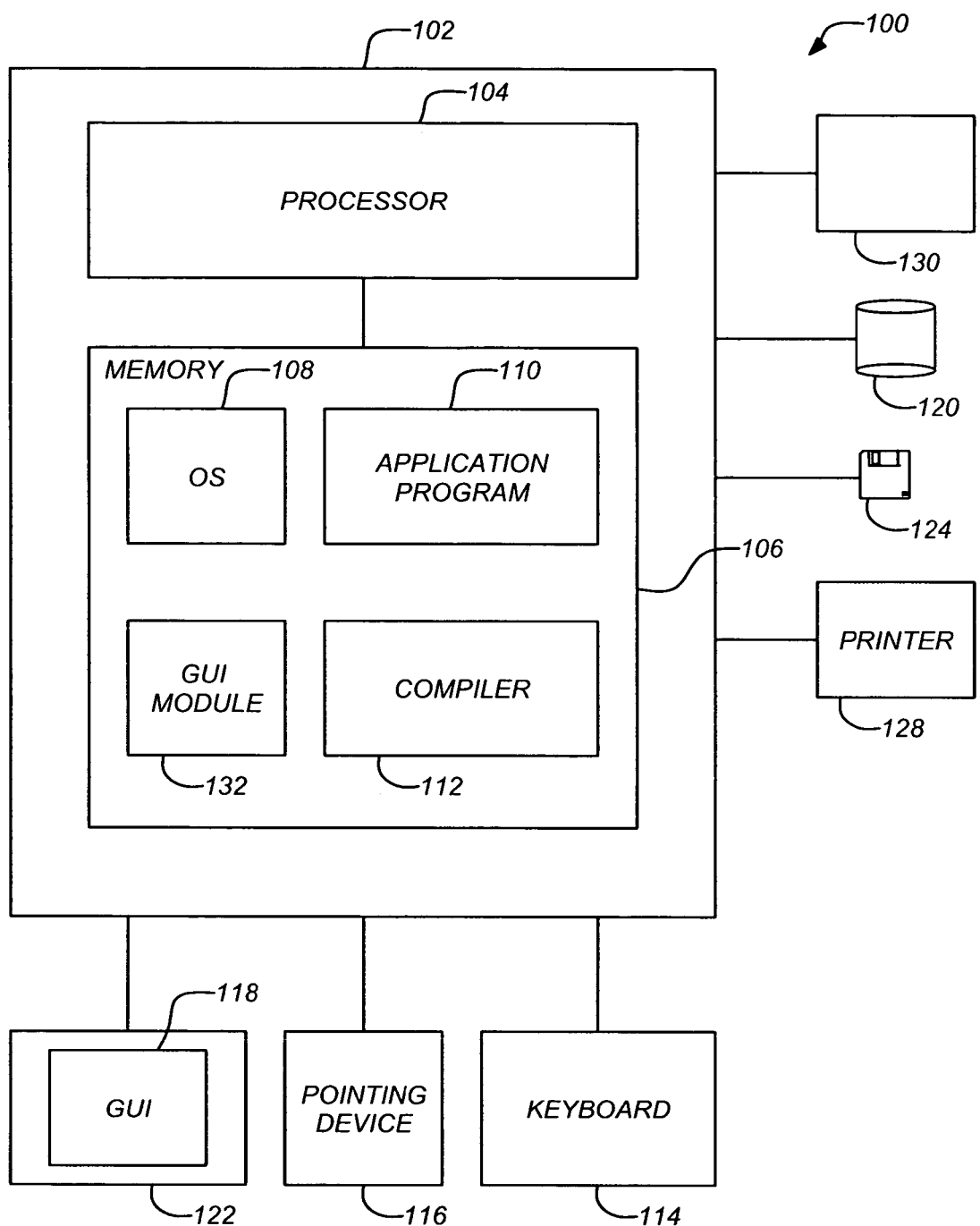
FIG. 1 is a block diagram of a computer system operable with embodiments of the invention.

FIG. 1 illustrates an exemplary computer system 100 that can be used to implement selected modules and/or functions of the present invention. The computer 102 comprises a processor 104 and a memory 106, such as random access memory (RAM). The computer 102 is operatively coupled to a display 122, which presents images such as windows to the user on a graphical user interface 118. The computer 102 may be coupled to other devices, such as a keyboard 114, a mouse device 116, a printer, etc. Of course, those skilled in the art will recognize that any combination of the above components, or any number of different components, peripherals, and other devices, may be used with the computer 102.

Generally, the computer 102 operates under control of an operating system 108 (e.g. OS/2, LINUX, UNIX, WINDOWS, MAC OS) stored in the memory 106, and interfaces with the user to accept inputs and commands and to present results, for example through a graphical user interface (GUI) module 132. Although the GUI module 132 is depicted as a separate module, the instructions performing the GUI functions can be resident or distributed in the operating system 108, the computer program 110, or implemented with special purpose memory and processors. The computer 102 also implements a compiler 112 which allows an application program 110 written in a programming language such as C++, JAVA, ADA, BASIC, VISUAL BASIC or any other programming language to be translated into code readable by the processor 104. After being compiled, the computer program 110 accesses and manipulates data stored in the memory 106 of the computer 102 using the relationships and logic that was generated using the compiler 112. The computer 102 also optionally comprises an external communication device 130 such as a modem, satellite link, ethernet card, or other device for communicating with other computers, e.g. via the Internet.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc 124, hard drive, DVD/CD-rom, digital tape, etc. Further, the operating system 108 and the computer program 110 comprise instructions which, when read and executed by the computer 102, cause the computer 102 to perform the steps necessary to implement and/or use the present invention. Computer program 110 and/or operating system 108 instructions may also be tangibly embodied in the memory 106 and/or transmitted through or accessed by the data communication device 130. As such, the terms "article of manufacture," "program storage device" and "computer program product" as may be used herein are intended to encompass a computer program accessible and/or operable from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Embodiments of the present invention are generally directed to the processor 104 comprising a plurality of vector processors and memory 106 hardware, as well as the program instructions for operating these elements. Particularly, embodiments of the invention comprise memory caching with vector processors. The invention enhances overall system performance by improving the combined operations of memory access and instruction execution with vector processors.

2. Memory Caching with Vector Processors

Figure 2A:
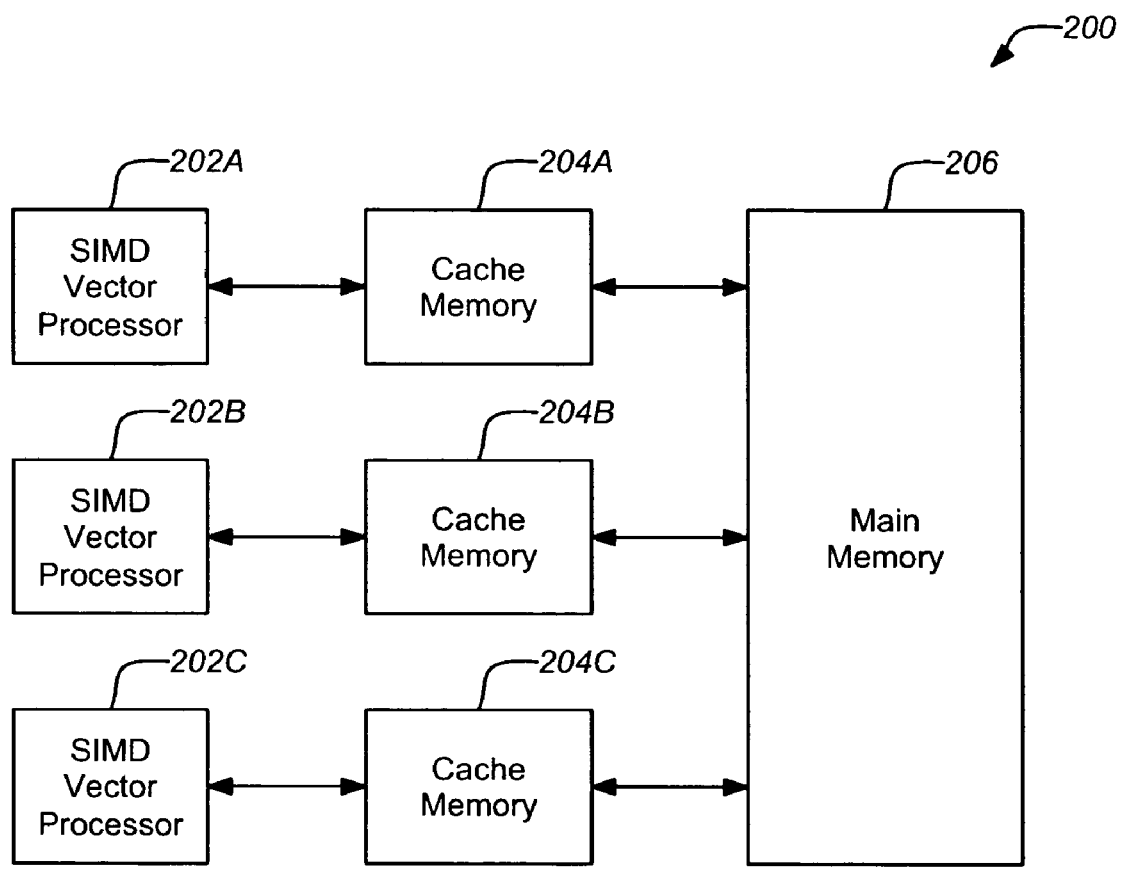
FIG. 2A is a block diagram of an exemplary vector processor and memory architecture.

FIG. 2A shows a diagram of an exemplary vector-processor architecture 200 which may be employed as part of the processor 104 in the computer system 100 shown in FIG. 1 in an embodiment of the invention. Each of the three simple instruction/multiple data (SIMD) vector processors 202A-202C (which may be generically referenced as a vector processor 202) employs an independent instruction stream. In addition, each vector processor 202 includes instructions capable of processing multiple data items in parallel. For example, such a vector processing architecture may multiply corresponding 32-bit floating-point quantities in a 128-bit word in parallel.

As is well known in the art, cache memory may be employed by a computer processor to access data in memory more quickly than it can otherwise access the data. In general, as the processor operates on the data, it looks first in the cache memory and if it locates the data there, it does not have to resort to more time-consuming process of reading the data from the larger (and typically slower) memory.

Cache memory may be described in terms of levels of proximity and accessibility to the processor. For example, a level 1 (L1) cache resides on the same chip as the processor, e.g. the POWERPC 601 processor has a 32 kilobyte L1 cache built into its chip. The level 2 (L2) is often a separate static RAM (SRAM) chip. In contrast to the cache memory, the main memory is commonly a dynamic RAM (DRAM) chip.

Referring back to FIG. 2A, each of the vector processors 202A-202C is operatively coupled to a high-speed local store memory or cache memory 204A-204C (which may be generically referenced as a cache memory 204). The cache memory 204A-204C of each vector processor 202A-202C is operatively coupled to a larger main memory 206. It is important to note that embodiments of the invention are not limited to any specific number of vector processors. For example, the cell processor architecture previously described which may utilize embodiments of the invention includes eight vector processors. In addition, embodiments of the invention are not limited to any particular cache level and the cache memory 204 may reside in the vector processor 202 or be a separate component.

A memory access occurs whenever data is read or written to any memory device. Each vector processor is capable of directly accessing only its own local store memory (e.g. 256 Kbyte). Vector processors must use direct memory access (DMA) to copy between main memory and their local memory.

As previously mentioned, embodiments of the present invention are directed to cache memory 204 with vector processors 202 to improve cache lookup performance. Embodiments of the invention maintain cache metadata in one or more arrays and use vector instructions to process the array elements in parallel. The virtual tag and physical address information may be interleaved into a single array. Alternately, the virtual tag and physical address information may be maintained in a plurality of separate arrays. In either case, there is a separate array mapping from a local-store cache line to a tag corresponding to the line currently loaded into that line.

Figure 2B:
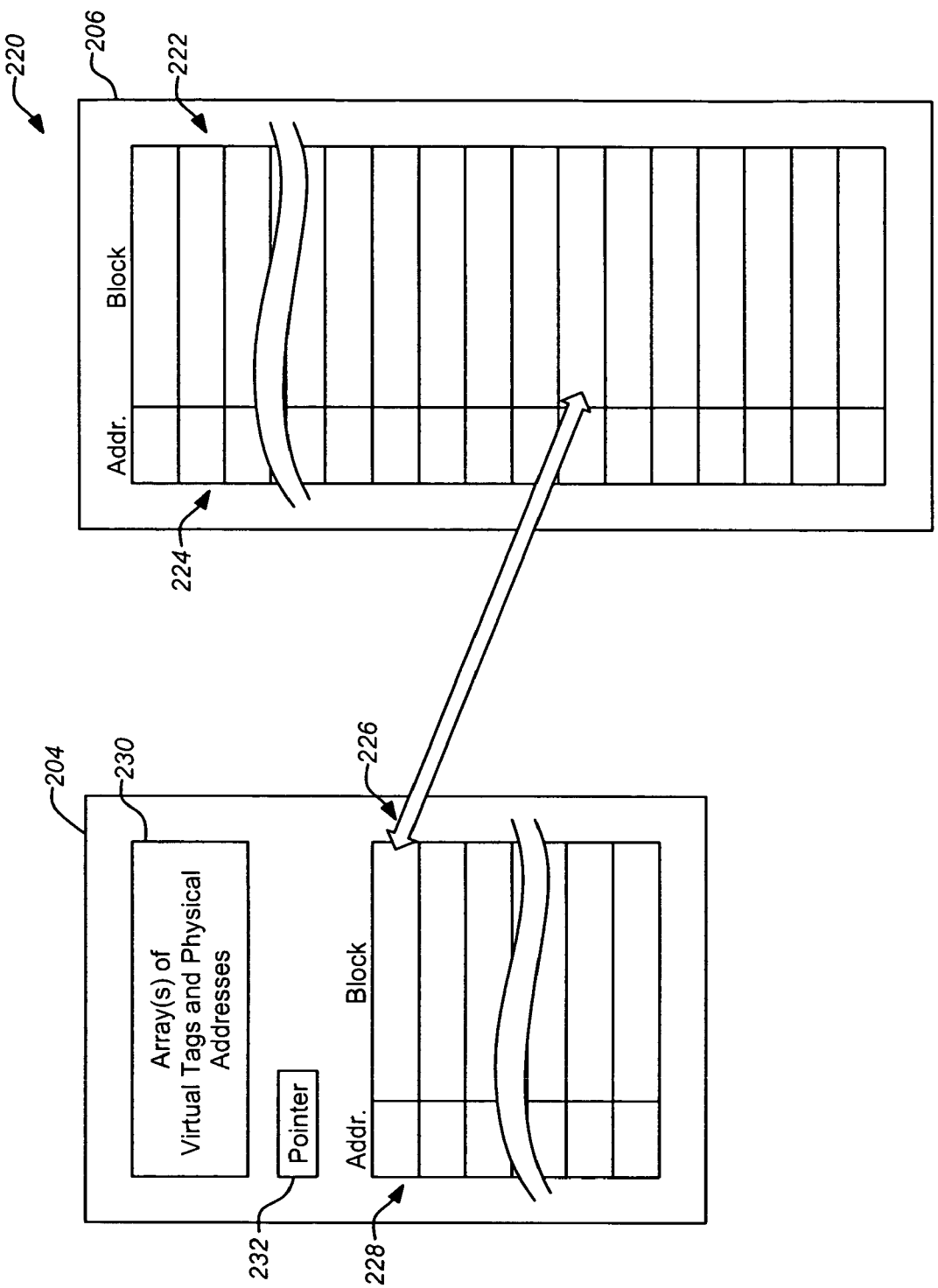
FIG. 2B is a block diagram of of the data structure of the cache and main memory of the architecture of FIG. 2A.

FIG. 2B is a block diagram of of the data structure 220 of the cache and main memory of the architecture of FIG. 2A. The main memory 206 comprises data arranged in blocks 222 where each block 222 has a unique main memory address 224. As data is accessed by a vector processor 202, the desired data block(s) 222 are copied to the small, faster cache memory 204 for the particular vector processor 202 and stored in the cache memory blocks 226 where each block has a unique cache memory address 228.

A roving pointer 232 may be employed to identify which block 226 is to be ejected from the cache memory 204 to make room for a new block 222 from the main memory 206. In one example, the roving pointer may be resident in the cache memory 204, but in a different portion of the local store than that used to cache the blocks of data from main memory 206 (e.g. the cache metadata arrays 230 and cache memory address 228). Alternately, the roving pointer may also be maintained elsewhere, e.g. a machine register.

Management of the data between the cache memory 204 and the main memory 206 is facilitated through one or more cache metadata arrays 230 comprising the virtual tags and physical addresses of the main memory 206 and cache memory 204, respectively. The one or more cache metadata arrays 230 define a correspondence between main memory 206 data blocks 222 and cache memory 204 data blocks 226. Each of the plurality of vector processors 202 uses vector instructions to process the cache metadata in parallel to identify the portion of the main memory 206 data blocks 222 present in the cache memory 204 data blocks 226.

Parallel processing the cache metadata involves comparing a data word including a replicated virtual tag with an array comprising a plurality of virtual tags to identify a matching virtual tag such that the replicated virtual tag is compared substantially simultaneously with at least two of the plurality of virtual tags. The procedure of parallel processing of the cache metadata is further illustrated in sections 3 and 4 hereafter.

Figure 2C:
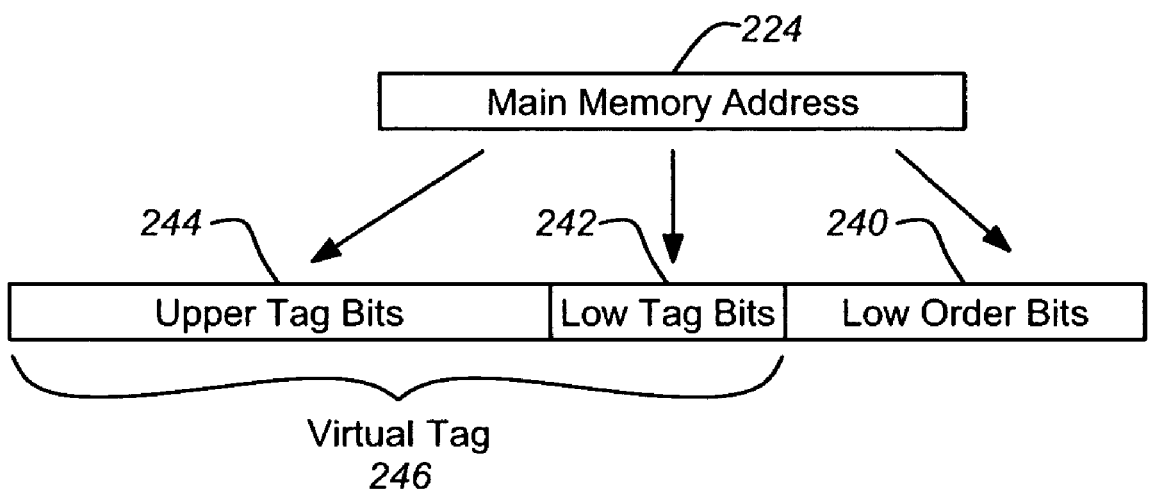
FIG. 2C illustrates the the components of the main memory address used in the lookup process.

FIG. 2C illustrates the the components of the main memory address used in the lookup process. With embodiments of the invention, a main memory address may includes three parts. A first set of low order bits 240 of the main memory address 224 passed through the cache algorithm unchanged and affixed to a local store address created by the cache algorithm. A second set of low order bits 242 (low order tag bits) of the main memory address 224 is used to index into the physical address, tag and physical address-tag arrays. Finally, the upper bits 244 of the main memory address 224 are used (with the second set of low order bits 242) only to generate the main memory addresses 224 accessed through DMA. Embodiments of the invention employ a combination of the second set of low order bits 242 and the upper bits 244, i.e. a virtual tag 246, compared against the virtual tags of the array(s) 230. These bits 240, 244 are also used to generate main memory addresses 224 (DMA addresses). Essentially, the second set of low order bits 242 alone is used to index into the metadata arrays 230. The accompanying first set of low order bits 240 are utilized only when a successful lookup into the metadata arrays 230 occurs. In this event the physical address within the array 230 is joined to the first set of low order bits 240, which are the same as the low order bits of the combined local store address.

To illustrate, a cache line size of 1024 bytes may be used with one or more cache metadata arrays (comprising the physical addresses and virtual tags) having 64 entries and a local store memory size of 256 Kbytes. The caching process may use a 32 bit address to portions of the main memory. In this example, there are 10 bits in the first set of low order bits, 6 bits in the second set of low order (tag) bits and 16 upper bits for the address entering the cache algorithm. There are 8 upper bits (from the physical address array in the non-interleaved scheme and from the physical address portion of the array in the interleaved scheme detailed hereafter) and 10 low-order bits in the first set of low order bits of the main memory address.

3. Interleaved Cache Metadata Array

Figure 3:
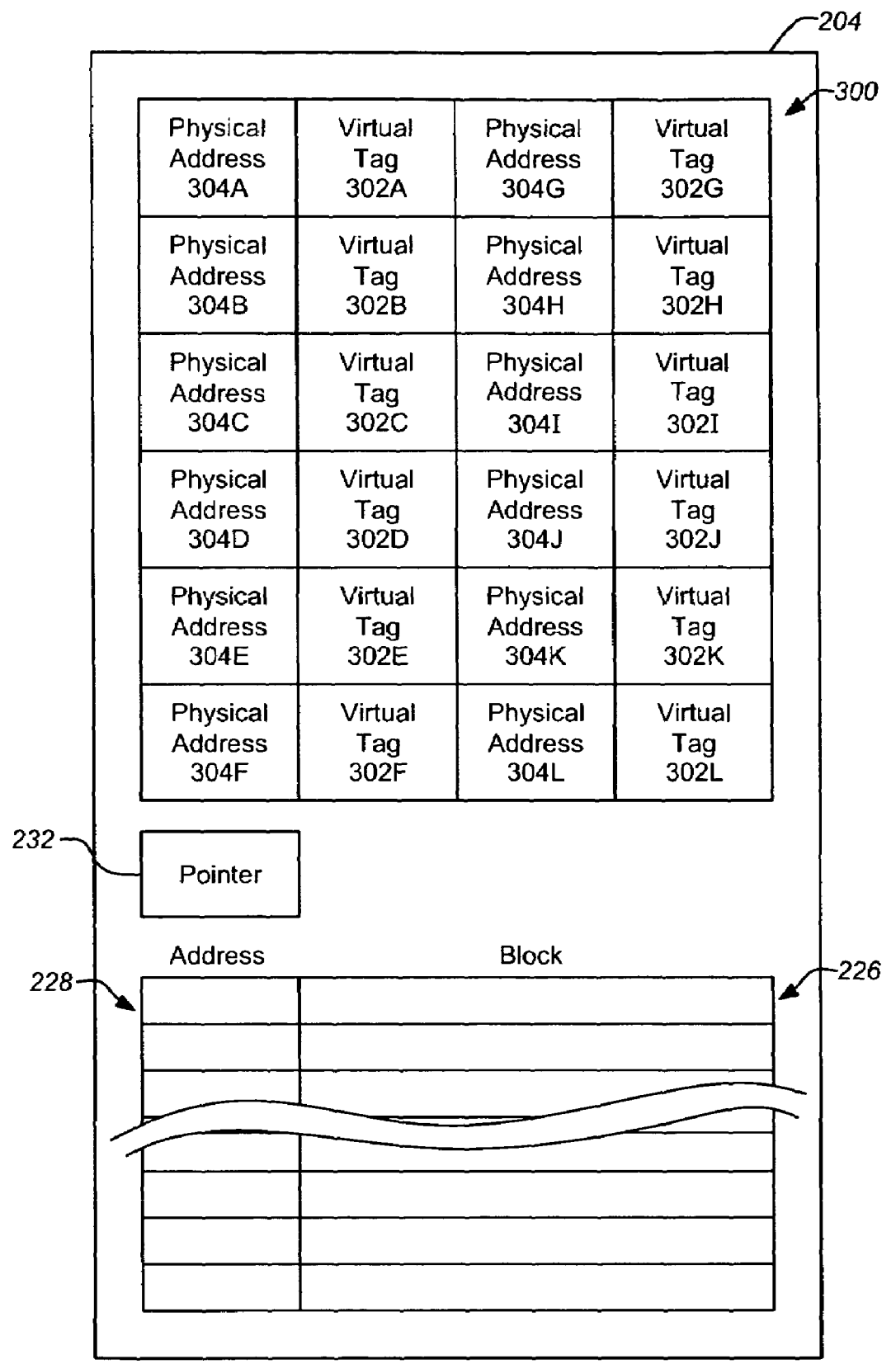
FIG. 3 shows a diagram of an interleaved metadata array 300 of the virtual tags and physical addresses according to an exemplary embodiment of the present invention.

FIG. 3 shows a diagram of an interleaved metadata array 300 of the virtual tags 302A-302L (which may be generically referenced as a virtual tag 302) and physical addresses 304A-304L (which may be generically referenced as a physical address 304) according to an exemplary embodiment of the present invention. This array 300 resides in the cache memory 204 for each of the vector processors 202. Although the interleaved organization is common for each of the cache memories 204, the values in the array 300 are unique for each cache memory 204 as they each operate on distinct portions of the main memory 206.

According to certain embodiments of the present invention, virtual tags 302 and physical addresses 304 are interleaved in the single array 300. The array 300 is indexed by a simple bit-mask hash of the main memory 206 address, similar to a conventional hardware CPU cache. Each virtual tag 302 comprises the upper bits of the virtual address (the address 224 of a data block 222 in the larger main memory 206). Each physical address 304 comprises the upper bits of the address 228 of a data block 226 in the cache memory 204.

As previously mentioned, the roving pointer 232 holds the address 228 of which block 226 should next be ejected from the cache memory 204 to make room for a new block 222 from the main memory 206. There are a variety of known replacement strategies that could be used, including LRU (Least Recently Used), LFU (Least Frequently Used), and random replacement. However, the roving pointer 232 provides a very simple and fast alternative to these replacement strategies. Alternately, the roving pointer 232 may be implemented as an index rather than a pointer. For example, the index may be considered an array index, e.g. "x" is the index in an example array, tmp=physaddr[x].

An exemplary method embodiment of the invention comprises deriving a selected virtual tag from a selected virtual address of data in a main memory, the selected virtual tag comprising a portion of the selected virtual address and replicating the selected virtual tag in a word and comparing the word with an array comprising a plurality of virtual tags to identify a matching virtual tag. The replicated selected virtual tag is compared substantially simultaneously with at least two of the plurality of virtual tags where the matching virtual tag corresponds to a physical address of the data in a cache memory. With the interleaved cache metadata array, two virtual tags may be compared substantially simultaneously, corresponding to two 32 bit tags interleaved in a 128-bit register.

Figure 4A:
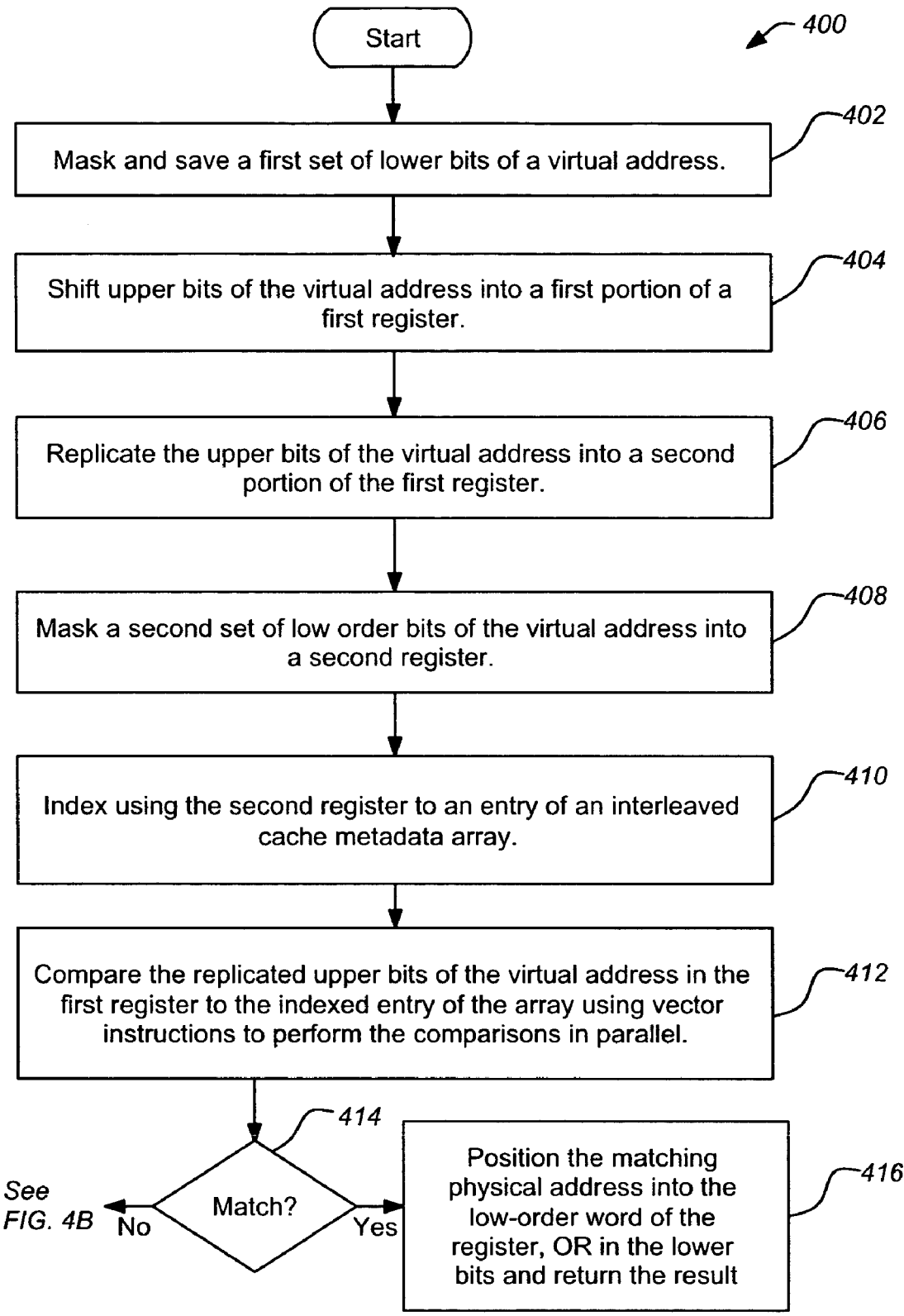
FIG. 4A is a flowchart of a fastpath procedure of caching memory using vector processors with an interleaved organization of the cache-tag and physical-address information.

FIG. 4A is a flowchart of a fastpath procedure 400 of caching memory using vector processors with an interleaved organization of the virtual tag and physical address information. This fastpath procedure 400 is used to look up a physical address in cache memory from a selected virtual address of data in the main memory.

First, a selected virtual tag must be derived from the selected virtual address. This may be done first through an operation 402 of masking a first set of lower bits of the selected virtual address and saving them and then, through an operation 404 of shifting the remaining bits (including the upper bits and a second set of low order bits) of the selected virtual address down into a first portion (e.g. the least-significant portion) of a word. This is done so that the data word may be used directly to compare with the virtual tags. The upper bits of the selected virtual address and the second set of low order bits comprise the selected virtual tag. For example, the caching process may use a 32 bit address to portions of the main memory. Thus, there are 10 bits in the first set of low order bits, 6 bits in the second set of low order (tag) bits and 16 upper bits for the address entering the cache algorithm. There are 8 upper bits and 10 low-order bits in the first set of low order bits of the main memory address. Other combinations of bit sizes may also be employed as understood by those skilled in the art.

Figure 5A:
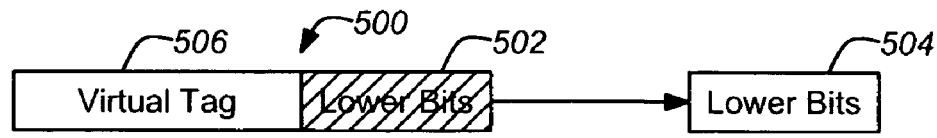
FIGS. 5A-5G illustrate the data operations for the cache procedures of FIGS. 4A and 4B.
Figure 5B:
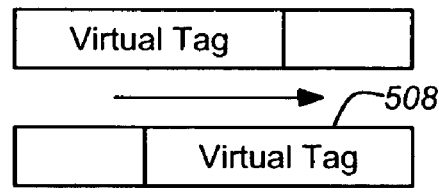

FIGS. 5A and 5B illustrate the data operations for deriving a selected virtual tag 506 from a selected virtual address 500. The virtual address 500 includes the the first set of lower bits 502 which are saved in a separate register 504. The selected virtual tag 506, which comprises the the upper bits and the second set of lower bits of the virtual address 500, are shifted into a first portion 508 of a word (e.g. a 32-bit word).

Figure 5C:
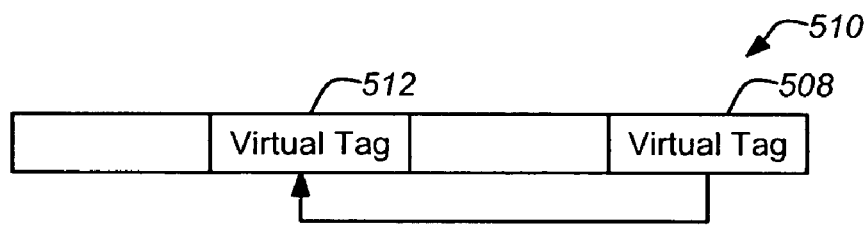

The selected virtual tag 506 is then replicated in a first register to enable parallel processing with the vector instructions in operation 406 of FIG. 4A. The virtual tag of the selected virtual address is replicated into a second portion of the first register, e.g. the second-most-significant 32-bit word of the 128-bit register. FIG. 5C illustrates the virtual tag 506 in the first portion 508 of the first register 510 is replicated into a second portion 512 of the register 510.

Figure 5D:
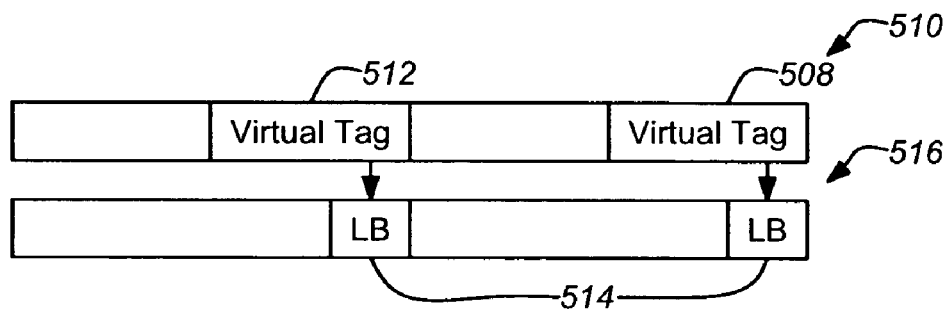
Figure 5E:
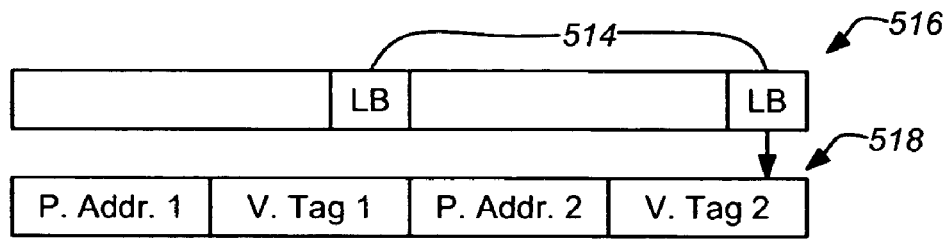

In operation 408 of FIG. 4A, the second set of low order bits 514 of the virtual address 500 are masked into a second register 516 as illustrated in FIG. 5D. The number of bits must be equal to the shift count used above. These bits in the second register are used to index into the interleaved cache metadata array. In operation 410 of FIG. 4A, the masked second set of low order bits 514 from operation 408 in the second register 516 are used to index into the interleaved cache metadata array (comprising the virtual tags and physical addresses) and identify an entry 518 of the metadata array to be compared as illustrated in FIG. 5E.

Figure 5F:
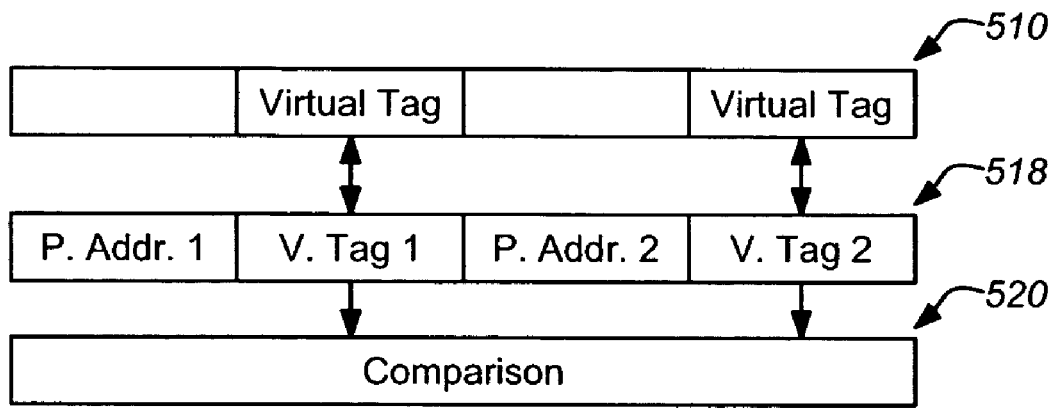

In operation 412 of FIG. 4A, the replicated bits (i.e. the selected virtual tag) in the first register 510 are compared to the entry 518 using vector instructions to perform the comparisons in parallel. Note that a single array index operation is used to fetch the entry 518, comprising the two virtual tags and the two physical addresses in the example, as indicated by the single arrow comparing second register 516 and entry 518. Although two tags are employed in the single array index operation in this example, embodiments of the invention may operate with vector processor designs where any number of tags two or more may be employed in the single array index operation, as understood by those skilled in the art. Following this in operation 414, a determination is made of which (if any) of the two virtual tags of the entry 518 match with the replicated upper bits in the first register 510 as illustrated in FIG. 5F. Each indexed entry 518 is compared with the first register 510 to output to a third (comparison) register 520 to determine if a match exists. Some vector processors may provide special vector instructions to identify a match. As an example, this comparison may be performed between a pair of 128-bit quantities in 32-bit portions. Each 32-bit portion is compared to yield all ones in the third register in the event of a match and all zeroes otherwise. A special vector instruction may be employed which counts the number of leading zero bits in a register in order to determine how far to shift corresponding physical address bits. Finding a match or not determines how the desired data must be retrieved.

Figure 5G:
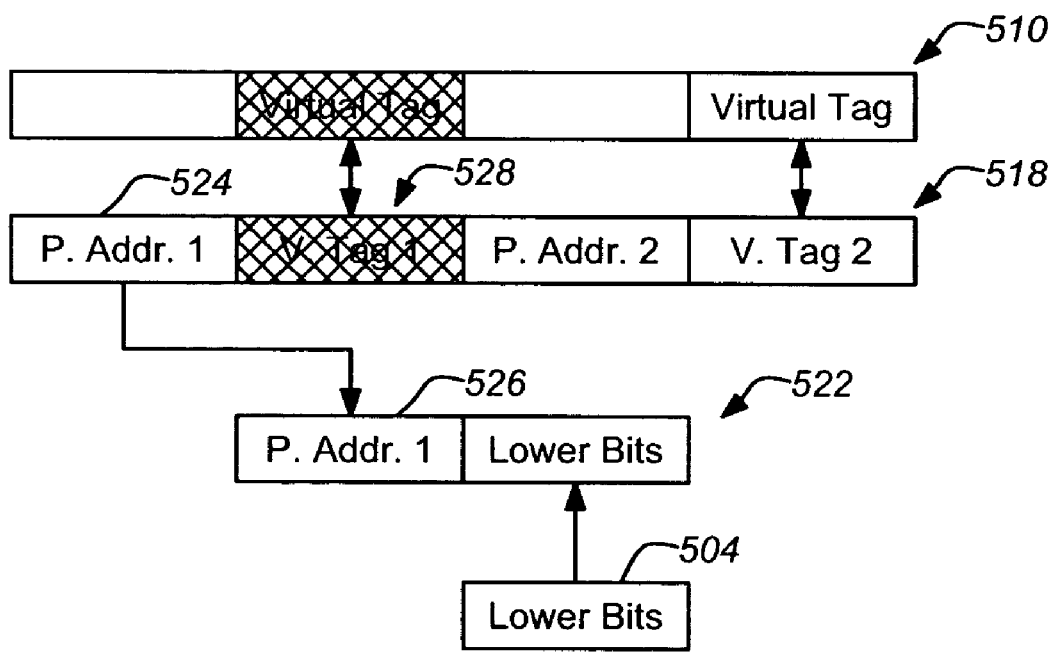

If there is no match, then the corresponding cache line from the main memory is loaded and the cache data structures are updated as described in the main memory access procedure 420 below, returning the corresponding local store address to the caller. If there is a match 528, the matching physical address 524 is copied into the low-order word 526 of the fourth register 522 and the lower bits 502 masked out in operation 402 are copied in (via an "OR" operation), and the result is returned in a fourth register 522 as shown in FIG. 5G to complete the cache process. For example, the quantities being "OR"ed are properly aligned, and all the other bits have been zeroed out, both as a result of prior operations. Thus, the "OR" operation naturally combines the quantities, since "OR"ing a given value with a zero bit always results in that given value. Many vector processors may have special instructions to efficiently accomplish this operation.

Figure 4B:
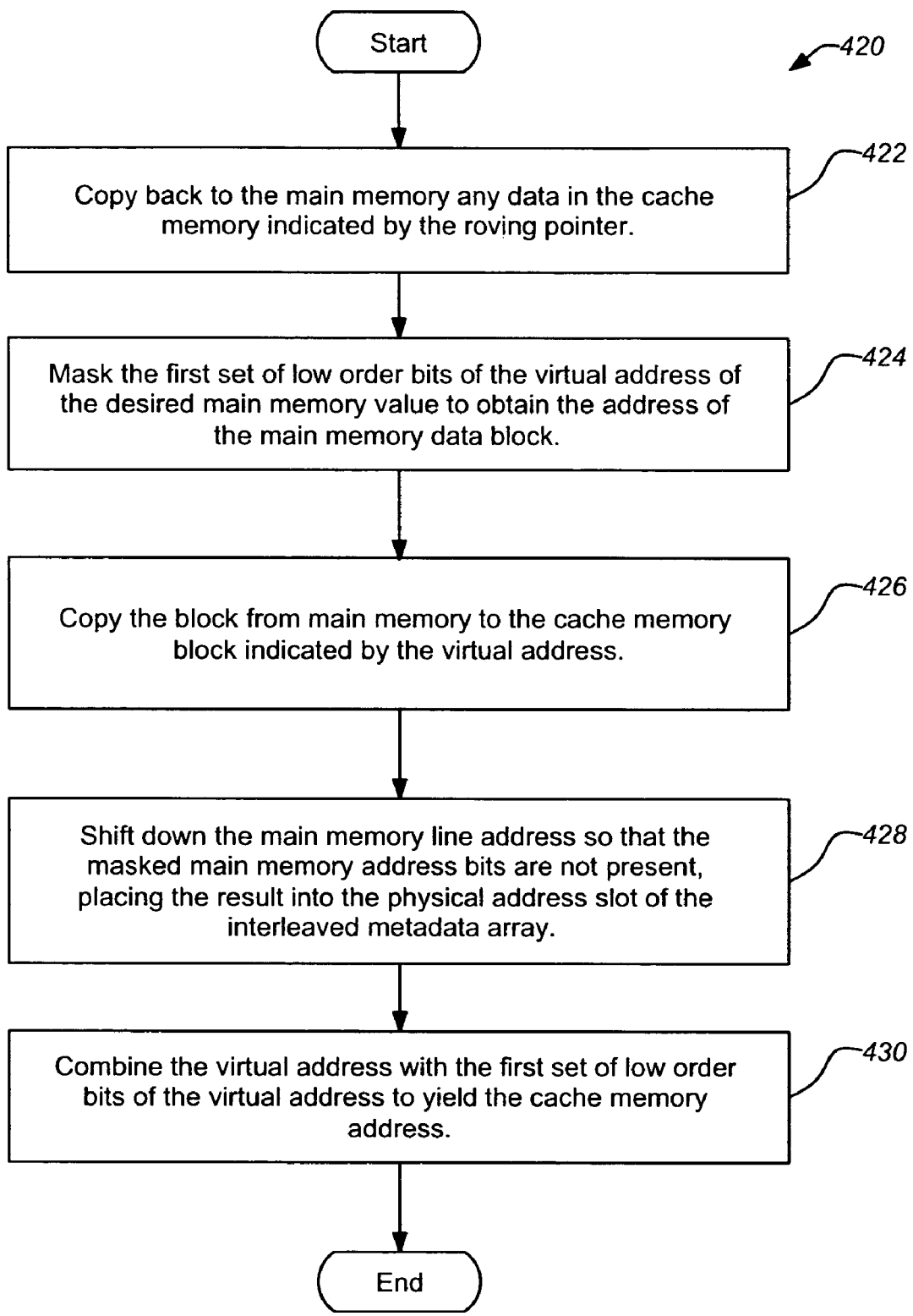
FIG. 4B is a flowchart of a main memory access procedure using vector processors with an interleaved organization of the cache-tag and physical-address information.

FIG. 4B is a flowchart of a main memory access procedure 420 using vector processors with an interleaved organization of the cache-tag and physical-address information. As described in the fastpath procedure 400 above, if the desired data block is not present in the cache memory, the corresponding data block must be fetched from the main memory. Thus, a cache memory block indicated by a roving pointer is replaced with the data in the main memory at the selected virtual address in response to the no conclusion in operation 414 of the fastpath procecure 400 described above. This implementation assumes that the vector processor does not have direct access to the main memory, but rather utilizes a technique for copying blocks of data between its cache memory and the main memory. The line-fetch operation may be implemented as follows.

In operation 422, the cache memory block indicated by a physical address in the roving pointer is located. If the memory location indicated by the content of the roving pointer comprises data (e.g., the physical address is non-zero), then the old data indicated by the virtual address in the roving pointer must be copied (e.g. via DMA) back to the main memory location indicated by the virtual address. (Note that some implementations may additionally check if any of the cache data identified by the roving pointer have been modified and then copy back to the main memory only if so.) Next in operation 424, the low-order bits of the address of the desired main memory data are masked to obtain the address of the data block in the main memory. (This quantity may also be computed by shifting the tag-match quantity computed by operation 404 of the fastpath procecure 400 described above.) Following this, the data block from the main memory is copied to the local store address indicated by the virtual address in operation 426. Then in operation 428, the main memory data block address is shifted down so that the masked main memory address bits are not present, placing the result into the corresponding physical address slot of the cache metadata array. Lastly in operation 430 the virtual address is combined (via an "OR" operation for example) with the low-order bits of the desired main memory value (produced in operation 402 of the fastpath procedure 400, above) to yield the local-store address.

4. Non-Interleaved Cache Metadata Arrays

Figure 6:
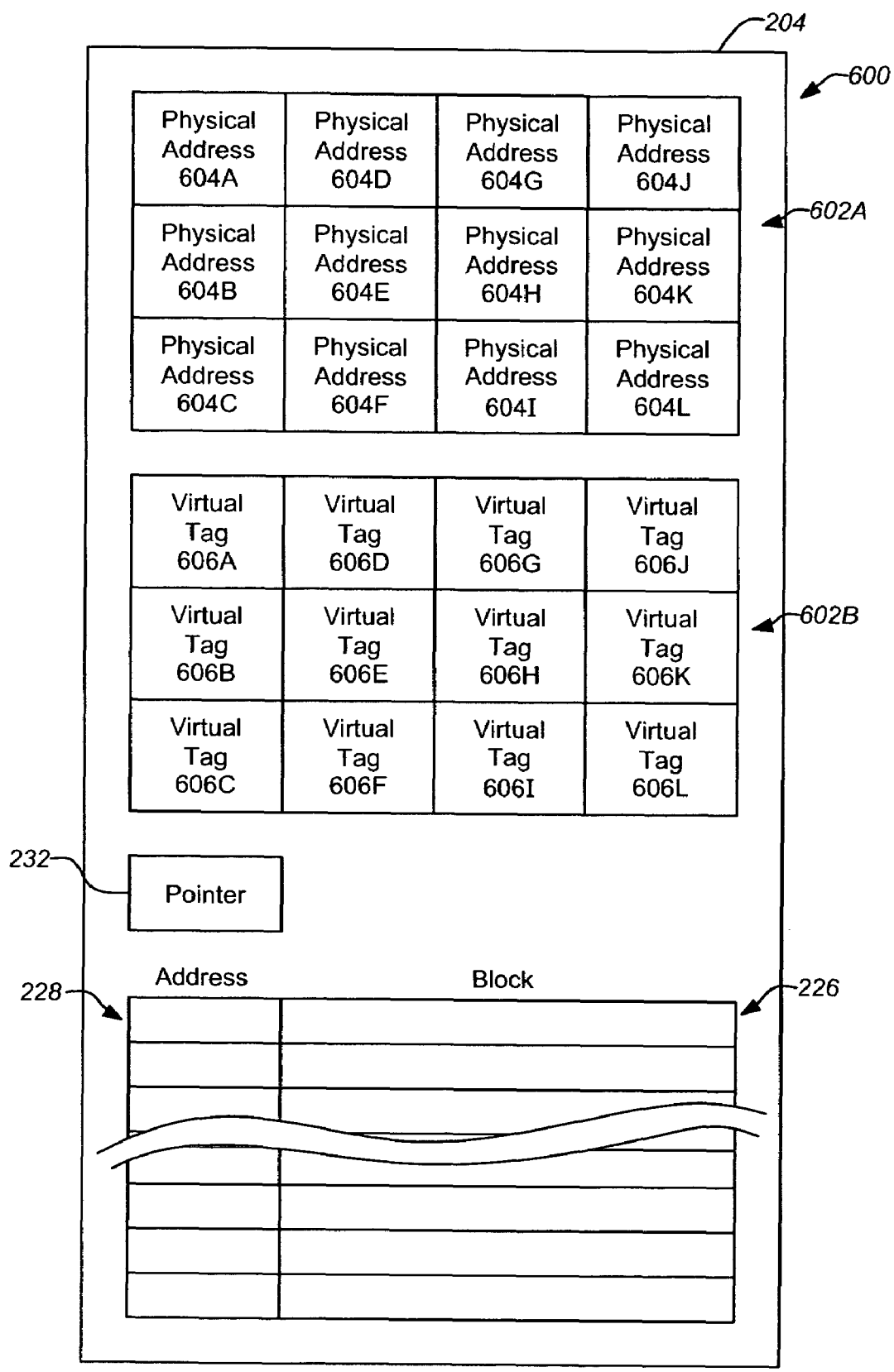
FIG. 6 shows a diagram of an interleaved organization of the cache-tag and physical-address information according to an exemplary embodiment of the present invention.

FIG. 6 shows a diagram of non-interleaved organization 600 of the cache metadata according to an exemplary embodiment of the present invention. In this approach, the virtual tags 606A-606L (which may be generically referenced as a virtual tag 606) and physical addresses 604A-604L (which may be generically referenced as a physical address 604) of the cache metadata are maintained in separate arrays 602A, 602B. However, as with the interleaved cache array above, these arrays 602A, 602B may also be indexed by a simple bit-mask hash of the main memory address. Each virtual tag 606 comprises the upper bits of the virtual address (the address 224 of a data block 222 in the larger main memory 206). Each physical address 604 comprises the upper bits of the address 228 of a data block 226 in the cache memory 204.

Here also, the roving pointer 232 holds the address 228 of which block 226 should next be ejected from the cache memory 204 to make room for a new block 222 from the main memory 206. There are a variety of known replacement strategies that could be used, including LRU (Least Recently Used), LFU (Least Frequently Used), and random replacement. However, the roving pointer 232 provides a very simple and fast alternative to these replacement strategies.

Just as with the interleaved example above, an exemplary method embodiment of the invention using non-interleaved arrays comprises deriving a selected virtual tag from a selected virtual address of data in a main memory, the selected virtual tag comprising a portion of the selected virtual address and replicating the selected virtual tag in a word and comparing the word with an array comprising a plurality of virtual tags to identify a matching virtual tag. The replicated selected virtual tag is compared substantially simultaneously with at least two of the plurality of virtual tags where the matching virtual tag corresponds to a physical address of the data in a cache memory. With the non-interleaved cache metadata arrays, four virtual tags may be compared substantially simultaneously, corresponding to four 32 bit virtual tags in a 128-bit register from the array of virtual tags.

Figure 7A:
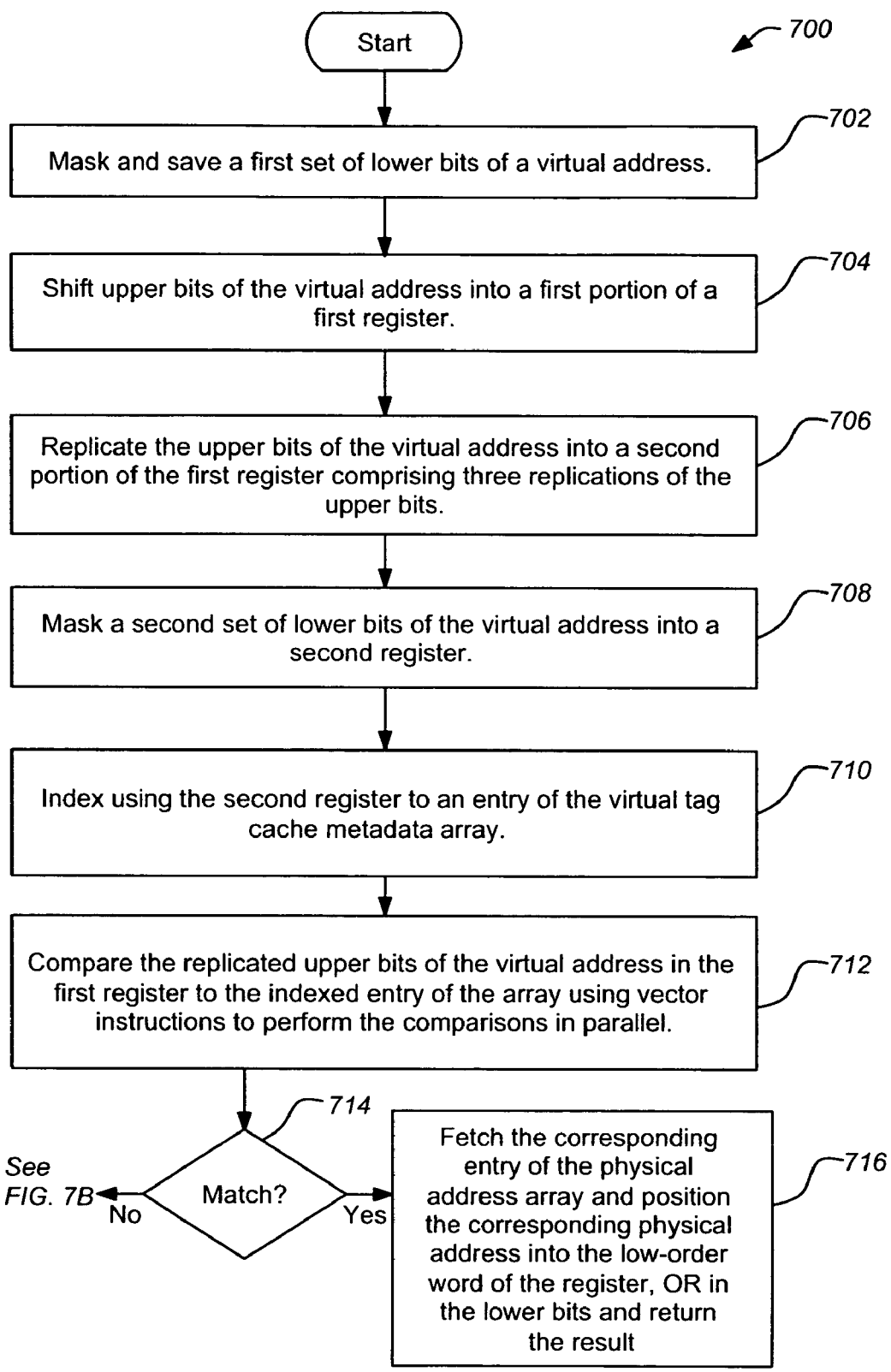
FIG. 7A is a flowchart of a fastpath procedure of caching memory using vector processors with a non-interleaved organization of the cache-tag and physical-address information in a plurality of tables.

FIG. 7A is a flowchart of a fastpath procedure 700 of caching memory using vector processors with a non-interleaved organization of the virutal tag and physical-address information in a plurality of tables. This fastpath procedure 700 is similar to the fastpath procedure 400 described above and is used to look up a physical address in cache memory from a selected virtual address of data in the main memory.

A selected virtual tag must be derived from the selected virtual address. This may be done first through an operation 702 of masking a first set of lower bits of the selected virtual address and saving them. Then, in operation 704, the remaining bits (including the upper bits and a second set of low order bits) of the selected virtual address are shifted down into a first portion (e.g. the least-significant portion) of a word. This is done so that the data word may be used directly to compare with the virtual tags. The upper bits of the selected virtual address comprise the selected virtual tag. The upper bits of the selected virtual address and the second set of low order bits comprise the selected virtual tag.

Figure 8A:
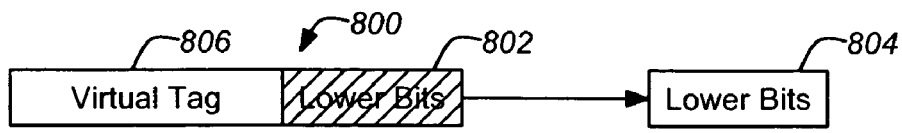
FIGS. 8A-8G illustrate the data operations for the cache procedures of FIGS. 7A and 7B.
Figure 8B:
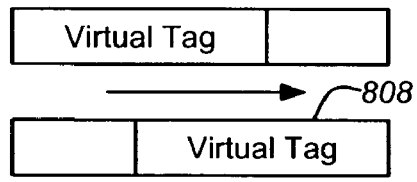

FIGS. 8A and 8B illustrate the data operations for deriving a selected virtual tag from a selected virtual address. The virtual address 800 includes the the first set of lower bits 802 which are saved in a separate register 804. The selected virtual tag 806 which comprises the upper bits and the second set of lower bits of the virtual address 800, are shifted into a first portion 808 of a word (e.g. a 32-bit word).

Figure 8C:
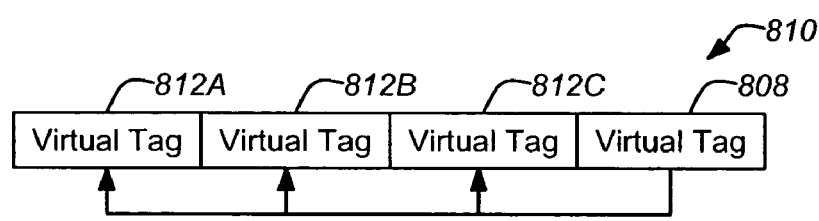

The selected virtual tag 806 is replicated in a data word to enable parallel processing with the vector instructions. In operation 706, the virtual tag of the selected virtual address is replicated into a second portion of the first register, e.g. the second-most-significant 32-bit word of the 128-bit register. FIG. 8C illustrates the virtual tag 806 in the first portion 808 of the first register 810 is replicated into a second portion 812A-812C of the register 810 comprising three replications of the virtual tag in this case.

Figure 8D:
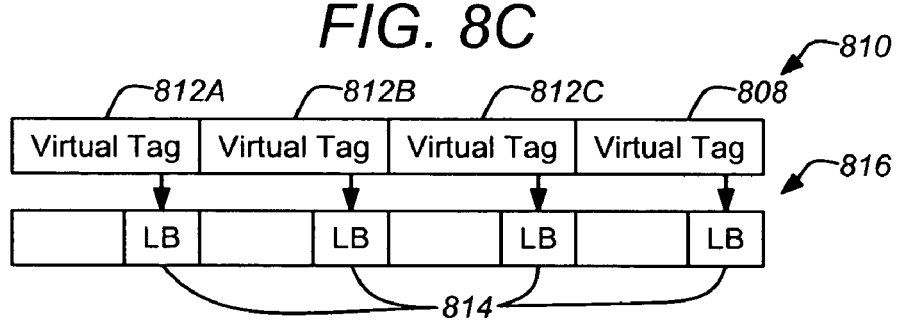
Figure 8E:
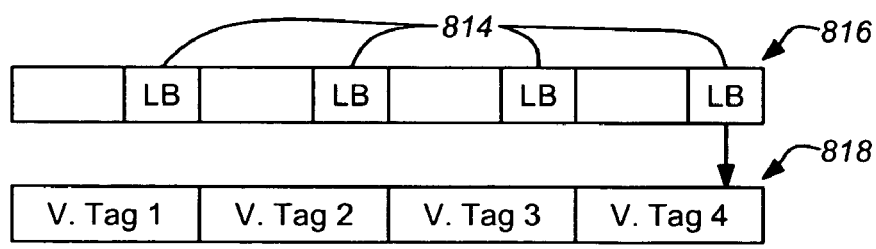

In operation 708 of FIG. 7A, the second set of low order bits 814 of the virtual address 800 are masked into a second register 816 as illustrated in FIG. 8D. The number of low-order bits must be equal to the shift count used above. These bits in the second register are now used to index into the virtual tag cache metadata array. Following this, in operation 710 of FIG. 7A, the masked second set of low order bits 814 from operation 708 in the second register 816 are used to index into the virtual tag array and identify an entry 818 of the array to be compared as illustrated in FIG. 8E.

Figure 8F:
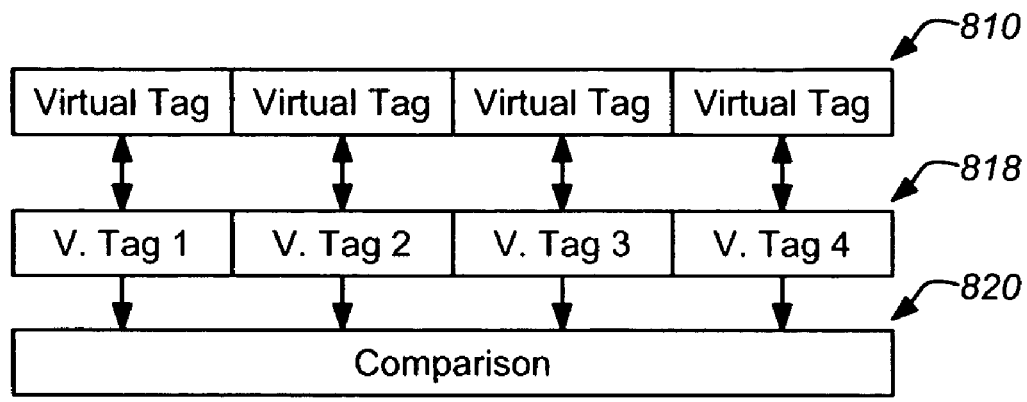

In operation 712 of FIG. 7A, the replicated virtual tags in the first register 810 are compared to the entry 818 using vector instructions to perform the comparisons in parallel. Embodiments of the invention fetch a plurality of virtual tags in a single index operation. Note that a single array index operation is used to fetch the entry 818, comprising the four virtual tags in the example, as indicated by the single arrow comparing second register 816 and entry 818. Although four tags are employed in the single array index operation in this example, embodiments of the invention may operate with vector processor designs where any number of tags two or more may be employed in the single array index operation, as understood by those skilled in the art. This is similar to operation 412 of FIG. 4A where an index operation yields an entry comprising two virtual tags. Following this in operation 714, a determination is made of which (if any) of the four virtual tags of the entry 818 match with the replicated virtual tags in the first register 810 as illustrated in FIG. 8F. Each indexed entry 818 is compared with the first register 810 to yield a result in a third (comparison) register 820 to determine if a match exists. Here also the comparison may be performed between a pair of 128-bit quantities in 32-bit portions. Each 32-bit portion is compared to yield all ones in the third register in the event of a match and all zeroes otherwise. A special vector instruction may be employed which counts the number of leading zero bits in a register in order to determine how far to shift corresponding physical address bits. Finding a match or not determines how the desired data must be retrieved.

Figure 8G:
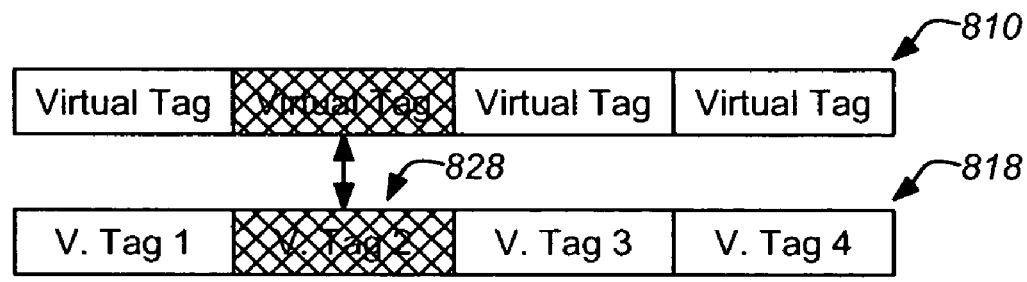
Figure 8G:
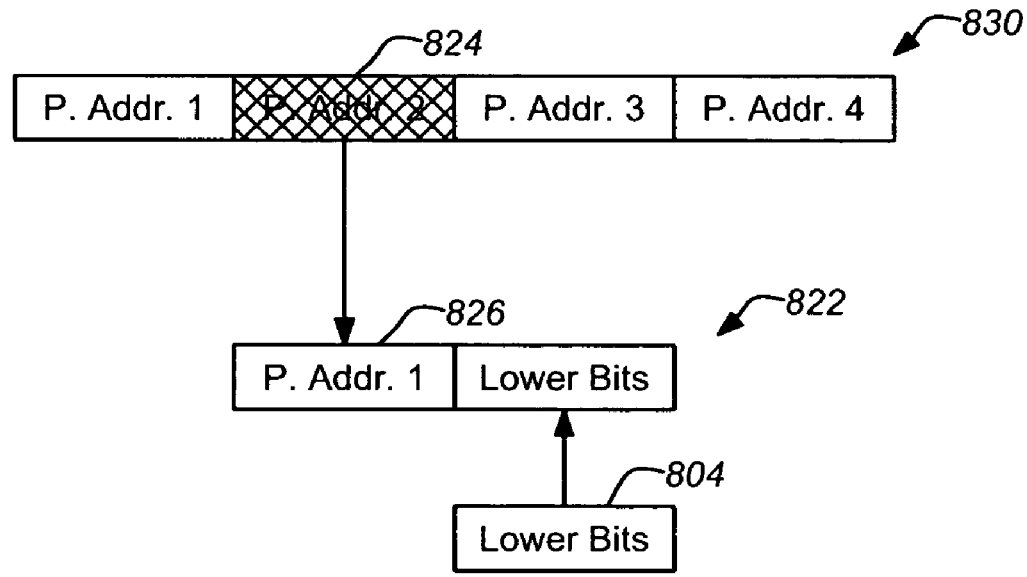

If there is no match, then the corresponding cache line from the main memory is loaded and the cache data structures are updated as described in the main memory access procedure 720 below, returning the corresponding local store address to the caller. If there is a match 828, the corresponding physical address 824 from a physical address entry 830 is fetched from the physical address array and copied into the low-order word 824. The first set of lower bits 802, masked out in operation 702, are now copied in (via an "OR" operation for example), and the result is returned in a fourth register 820 as shown in FIG. 8G. The vector processors may have special instructions to efficiently accomplish this operation.

Figure 7B:
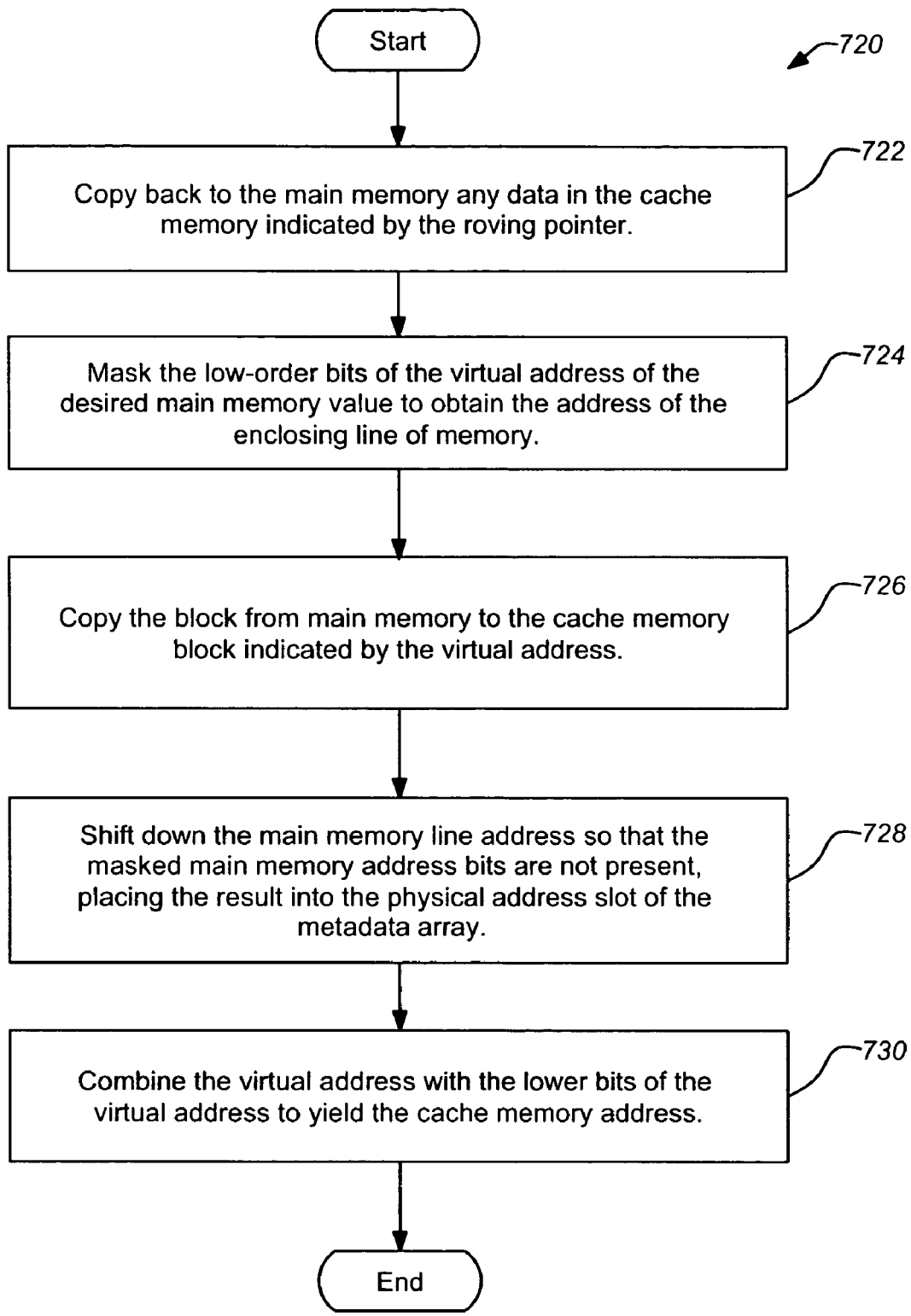
FIG. 7B is a flowchart of a main memory access procedure using vector processors with a non-interleaved organization of the cache-tag and physical-address information in a plurality of tables.

FIG. 7B is a flowchart of a main memory access procedure 720 using vector processors with a non-interleaved organization of the cache-tag and physical-address information in a plurality of tables. As described in the fastpath procedure 700 above, if the desired data block is not present in the cache memory, the corresponding data block must be fetched from the main memory. Thus, a cache memory block indicated by a roving pointer is replaced with the data in the main memory at the selected virtual address in response to not matching the virtual tag as described above. This implementation assumes that the vector processor does not have direct access to the main memory, but rather utilizes a technique for copying blocks of data between its cache memory and the main memory. The line-fetch operation may be implemented as follows.

In operation 722, the cache memory block indicated by a physical address in the roving pointer is located. If the memory location indicated by the content of the roving pointer comprises data (e.g., the physical address is non-zero), then the old data indicated by the virtual address in the roving pointer must be copied (e.g. via DMA) back to the main memory location indicated by the virtual address. In operation 724, the low-order bits of the address of the desired main memory data are masked to obtain the address of the data block in the main memory. The data block from the main memory is then copied to the local store address indicated by the virtual address in operation 726. Then in operation 728, the main memory data block address is shifted down so that the masked main memory address bits are not present, placing the result into the corresponding physical address slot of the physical address array. Finally, in operation 730, the virtual address is combined (via an "OR" operation) with the low-order bits of the desired main memory value (produced in operation 702 of the fastpath procedure 700, above) to yield the local-store address.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A computer program embodied on a computer readable medium, comprising:
   program instructions for deriving a selected virtual tag from a selected virtual address of data in a main memory and placing the selected virtual tag in a data word, the selected virtual tag comprising a portion of the selected virtual address;
   program instructions for replicating the selected virtual tag within the data word; and
   program instructions for comparing the data word with an array comprising a plurality of virtual tags to identify a matching virtual tag where the replicated selected virtual tag is compared substantially simultaneously with at least two of the plurality of virtual tags where the matching virtual tag corresponds to a physical address of the data in a cache memory.

2. The computer program of claim 1, wherein comparing the data word with the array is performed using vector instructions.

3. The computer program of claim 1, wherein the array comprises an interleaved arrangement of the plurality of virtual tags and a plurality of physical addresses.

4. The computer program of claim 1, wherein the array comprises the plurality of virtual tags and a second array comprises a plurality of physical addresses such that there is a correspondence between each of the plurality of virtual tags and each of the plurality of physical addresses.

5. The computer program of claim 1, further comprising program instructions for replacing a cache memory block indicated by a roving pointer with the data in the main memory at the selected virtual address in response to not identifying the matching virtual tag.

6. The computer program of claim 1, further comprising program instructions for retrieving a cache memory block indicated by the physical address in response to identifying the matching virtual tag.

7. The computer program of claim 1, wherein the program instructions for deriving the selected virtual tag from the selected virtual address comprises:
   program instructions for masking and saving lower bits of the selected virtual address; and
   program instructions for shifting upper bits of the selected virtual address to a lowest portion of a first register, the shifted upper bits comprising the selected virtual tag.

8. The computer program of claim 7, wherein replicating the selected virtual tag into the word comprises replicating the upper bits of the virtual address into a second portion of the first register.

9. The computer program of claim 8, wherein the program instructions for comparing the word with an array comprising a plurality of virtual tags to identify any matching virtual tag comprises:
   program instructions for masking the lower bits of the virtual address into a second register;
   program instructions for indexing with the second register into the cache metadata array and saving the corresponding entry in a third register; and
   program instructions for comparing the replicated upper bits of the virtual address in the first register to the entry in the third register using vector instructions to perform the comparisons in parallel to identify a match.

10. A method, comprising:
   deriving a selected virtual tag from a selected virtual address of data in a main memory and placing the selected virtual tag in a data word, the selected virtual tag comprising a portion of the selected virtual address;
   replicating the selected virtual tag within the data word; and
   comparing the data word with an array comprising a plurality of virtual tags to identify a matching virtual tag where the replicated selected virtual tag is compared substantially simultaneously with at least two of the plurality of virtual tags where the matching virtual tag corresponds to a physical address of the data in a cache memory.

11. The method of claim 10, wherein comparing the data word with the array is performed using vector instructions.

12. The method of claim 10, wherein the array comprises an interleaved arrangement of the plurality of virtual tags and a plurality of physical addresses.

13. The method of claim 10, wherein the array comprises the plurality of virtual tags and a second array comprises a plurality of physical addresses such that there is a correspondence between each of the plurality of virtual tags and each of the plurality of physical addresses.

14. The method of claim 10, further comprising replacing a cache memory block indicated by a roving pointer with the data in the main memory at the selected virtual address in response to not identifying the matching virtual tag.

15. The method of claim 10, further comprising retrieving a cache memory block indicated by the physical address in response to identifying the matching virtual tag.

16. The method of claim 10, wherein deriving the selected virtual tag from the selected virtual address comprises:
   masking and saving lower bits of the selected virtual address; and
   shifting upper bits of the selected virtual address to a lowest portion of a first register, the shifted upper bits comprising the selected virtual tag.

17. The method of claim 16, wherein replicating the selected virtual tag into the word comprises replicating the upper bits of the virtual address into a second portion of the first register.

18. The method of claim 17, wherein comparing the word with an array comprising a plurality of virtual tags to identify any matching virtual tag comprises:
   masking the lower bits of the virtual address into a second register;
   indexing with the second register into the cache metadata array and saving the corresponding entry in a third register; and
   comparing the replicated upper bits of the virtual address in the first register to the entry in the third register using vector instructions to perform the comparisons in parallel to identify a match.

* * * * *